Oct. 5, 1965 H. C. ROBERTS 3,210,754

DIGITAL TO ANALOGUE DECADE CONVERTER

Filed Oct. 19, 1961 2 Sheets-Sheet 1

INVENTOR.
HOWARD C. ROBERTS
BY John F. Friedl
ATTY

Oct. 5, 1965 H. C. ROBERTS 3,210,754

DIGITAL TO ANALOGUE DECADE CONVERTER

Filed Oct. 19, 1961 2 Sheets-Sheet 2

INVENTOR.
HOWARD C. ROBERTS
BY John F. Friedl
ATTY.

United States Patent Office 3,210,754

Patented Oct. 5, 1965

3,210,754

DIGITAL TO ANALOGUE DECADE CONVERTER

Howard C. Roberts, Urbana, Ill., assignor to Koehring Company, Milwaukee, Wis., a corporation of Wisconsin Filed Oct. 19, 1961, Ser. No. 146,291
3 Claims. (Cl. 340—347)

The present invention relates generally to digital to analogue converters and, more particularly, to an improved decade converter for producing a single electrical output response uniquely representative of diverse digital input signals.

Heretofore, decade converters have employed resistance networks in which a group, or decade, of series connected, precision resistors carried a known current. By providing a plurality of taps along the string of series connected resistors, each coupled to a different digit selector switch, it has been possible to produce an electrical output response representative of the selected digit. In effect, the diverse digit selector switches and their associated taps, together with the voltage source and the series connected precision resistors, constitute a variable voltage divider in which the particular value of the voltage tapped at any instant is representative of the selected digit. When the selected digit switch is closed a circuit is completed through a network of series resistors, the network including a "summing" resistor. Current flow through this "summing" resistor produces a voltage drop thereacross and, by appropriate selection of the various resistor values, the magnitude of the voltage drop can be made proportional to the numerical value of a selected digit.

However, such prior art decade converters have proven to be inaccurate and, therefore, unreliable for a number of reasons. The primary source of error heretofore encountered has been termed "loading error." This error results from the fact that while the decade of series connected precision resistors have a total resistance of known value, their effective total resistance varies dependent upon the position of the selected tapping point. For example, if the tap point selected is the mid-point of the decade of precision resistors, half of the resistors are connected in parallel with both the "summing" resistor and series connected limiting resistors of high value. Thus, the total effective resistance of the precision resistors in the decade is decreased.

In an effort to overcome or minimize the loading error encountered, it has heretofore been customary to keep the current flow extremely small, for example, by using resistors having high ohmic values. This solution has two serious disadvantages and has, in fact, proved to be no solution at all. In the first place, with small current flows the IR drop across the "summing" resistor is quite small and the resultant output $e_0$ of the decade converter is extremely small. Moreover, this attempted solution has not entirely eliminated the problem of loading error.

It is the general aim of the present invention to provide an improved decade converter which is not subjected to any appreciable loading error.

In another of its aspects, it is an object of the invention to provide an improved decade converter of the type employing a resistance network characterized by its ability to produce output voltages of considerably higher value than heretofore possible. A related object of the invention is to provide a novel resistance network for a decade converter wherein the magnitude of the output response is not only greater than heretofore possible, but also considerably more accurate.

A further object of the invention is to provide an improved resistance network for a decade converter characterized by its ability to convert diverse digital input signals to an electrical output response uniquely representative thereof and with a higher degree of accuracy than has heretofore been possible, yet wherein the overall cost of the circuit is not appreciably increased.

In another of its aspects, it is an object of the invention to provide an improved decade converter which employs relatively few high accuracy precision resistors yet which is considerably more reliable in operation.

These and other objects and advantages of the invention are attained by the construction and arrangement of exemplary embodiments of the invention as shown in the accompanying drawings, in which.

Figures 1, 2:
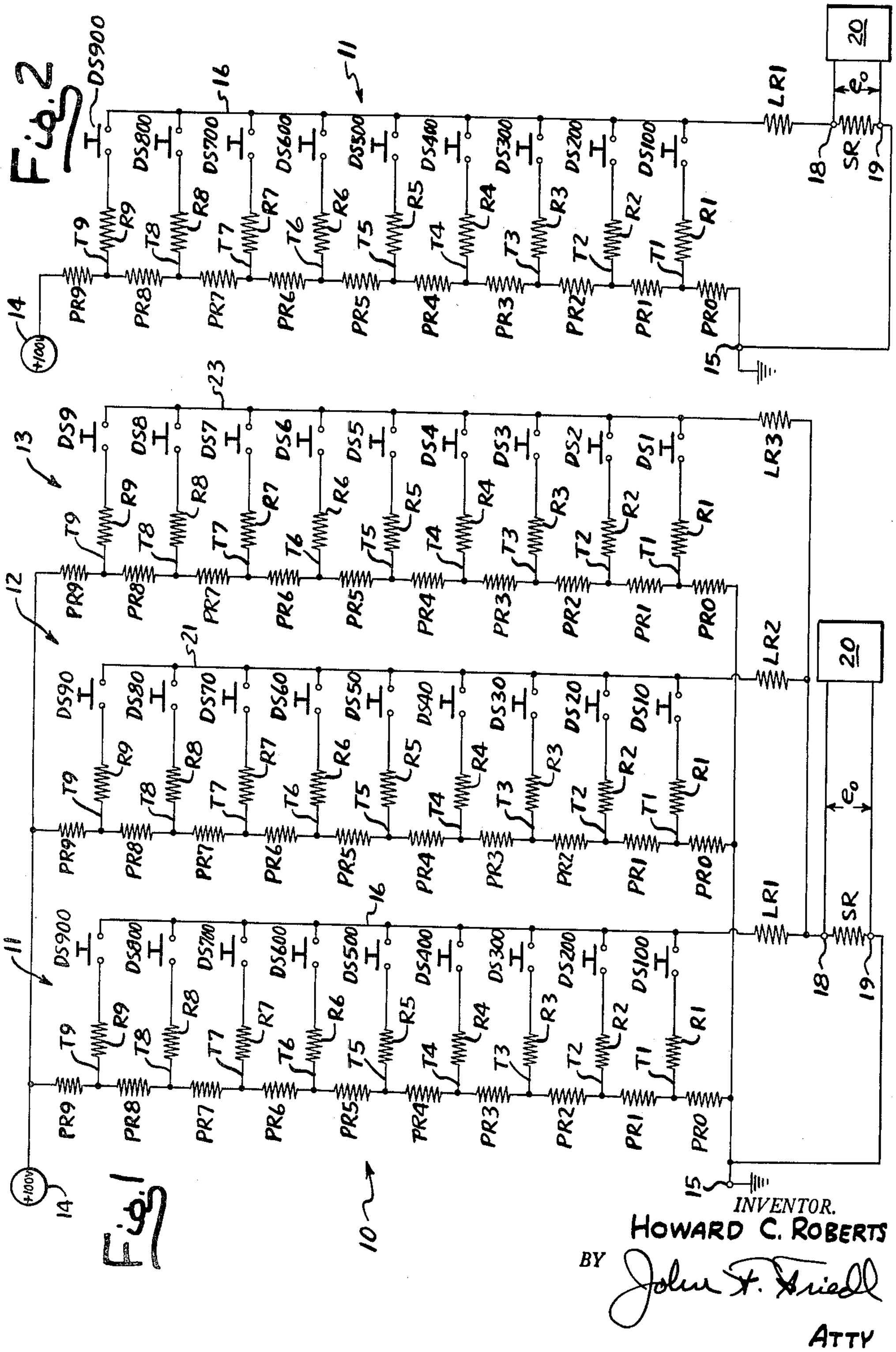
FIGURE 1 is a schematic diagram of a digital-to-analogue decade converter embodying the features of the present invention.
FIG. 2 is a schematic diagram of one of the decades shown in the converter of FIG. 1.

While the present invention is susceptible of various modifications and alternative constructions, illustrative embodiments are shown in the drawing and will herein be described in detail. It should be understood, however, that it is not intended to limit the invention to the particular forms disclosed. On the contrary, the intention is to cover all modifications, equivalents and alternative constructions falling within the spirit and scope of the invention as expressed in the appended claims.

Referring first to FIG. 1, there is illustrated a schematic diagram of a digital-to-analogue decade converter, generally indicated at 10, here shown as including a "hundreds" decade 11, a "tens" decade 12 and a "units" decade 13. Each of the digital decades 11, 12, 13 include a plurality of impedances, here shown as series connected, highly accurate, precision resistors PR0–PR9 which are connected across the terminals 14, 15, of a suitable voltage source (not shown). While the voltage source may be either D.C. or A.C. it will here be described as a direct voltage source having supply terminals 14, 15 of, merely by way of example, +100 v. and ground respectively.

The "hundreds" decade 11 includes a plurality of tap leads T1–T9 which are each connected at one end to respective ones of the precision resistors PR1–PR9. The opposite ends of the tap leads T1–T9 are respectively coupled to the normally open contacts of a plurality of digital selector switches DS100–DS900. The normally open contacts of the digit selector switches are electrically coupled to a "hundreds" bus 16 which includes a current limiting resistor LR1. One terminal 18 of a series connected "summing" resistor SR is electrically coupled to the resistor LR1 and the other terminal 19 of the resistor SR is coupled to the ground terminal 15 of the D.C. source.

In operation, depression of any one of the digit selector switches in the "hundreds" decade 11 completes an electrical circuit from the positive terminal 14 through selected ones of the precision resistors PR0–PR9 and through the now closed contacts of the actuated digit selector switch to the "hundreds" bus 16 and thence through the current limiting resistor LR1, and the "summing" resistor SR to the ground terminal 15. For example, if the digit selector switch DS500 is depressed, current will flow from the positive supply terminal 14 through the precision resistors PR9–PR5, the tap lead T5 and the now closed contacts of the digit selector switch DS500, the "hundreds" bus 16, the current limiting resistor LR1, and through the "summing" resistor SR back to the ground terminal 15. Current flow through the "summing" resistor SR produces an IR drop thereacross, here represented as an output potential $e_0$ picked off the terminals 18, 19 of the "summing" resistor. These terminals may be coupled to a suitable utilization device, generally indicated at 20.

Those skilled in the art will readily appreciate upon reference to FIG. 1 that the "tens" decade 12 is provided with a similar arrangement of tap leads T1–T9 and normally open digit selector switches DS10–DS90. The digit selector switch contacts are each coupled to a common "tens" bus 21 which includes a current limiting resistor LR2. The resistor LR2 is coupled to the terminal 18 of the "summing" resistor SR. Hence, depression of any one of the digit selector switches DS10–DS90 completes an electrical circuit through the selected precision resistors PR1–PR9 in the "tens" decade 12 and through the now closed digit selector switch contacts, the "tens" bus 21, the current limiting resistor LR2, the "summing" resistor SR, back to the ground terminal 15. In like manner, the "units" decade 13 is also provided with a plurality of tap leads T1–T9 respectively coupled to the contacts of digit selector switches DS1–DS9. The digit selector switches DS1–DS9 are in turn coupled to a "units" bus 23 which includes a current limiting resistor LR3. The resistor LR3 is electrically coupled to the terminal 18 of the "summing" resistor SR. Operation of the "units" decade is identical to the operation of the "hundreds" and "tens" decades heretofore described.

In order to facilitate an understanding of the present invention, it may be well to assign arbitrary values to the various resistors described above. In this manner the operation of the digital-to-analogue decade converter 10 may be more readily explained. Merely by way of example, let it be assumed that a voltage of 100 v. D.C. is applied across the terminals 14, 15 and that all of the precision resistors PR0–PR9 in each of the decades 11, 12, 13 have an ohmic value of 1000 ohms. Let it also be assumed that the value of the "summing" resistor SR is 1000 ohms while the value of the current limiting resistor LR1 is 99,000 ohms, the current limiting resistor LR2 is 999,000 ohms and the current limiting resistor LR3 is 9,999,000 ohms.

With the foregoing values in mind, if the digit selector switch DS500 in the "hundreds" decade 11 is closed, an electrical circuit will be completed through the "summing" resistor SR and current will flow therethrough. Since each of the precision resistors PR0–PR9 is of equal value (1000 ohms) there will be a voltage drop across the series connected resistors PR9–PR5 of 50 v. and the potential present at the "hundreds" bus 16 will be 50 v. Since the series connected current limiting resistor LR1 and "summing" resistor SR total 100,000 ohms, a current of .500 milliampere will flow through the "summing" resistor and the value of $e_0$ across the terminals 18, 19 will be .500 v. Similarly, if the digit selector switch DS200 has been depressed, a potential of 20 v. would be present at the "hundreds" bus 16 and a current of .200 milliampere would flow through the "summing" resistor, thus producing a potential $e_0$ of .200 v.

Alternatively, if the digit selector switch DS50 in the "tens" decade is depressed, a potential of 50 v. is present at the "tens" bus 21. Since the series connected current limiting resistor LR2 and the "summing" resistor SR total 1,000,000 ohms, a current of .050 milliampere flows through the "summing" resistor, thus producing an output potential $e_0$ of .050 v. In like manner, if the digit selector switch DS5 in the "units" decade 13 is depressed, a potential of 50 v. is present on the "units" bus 23. Since the current limiting resistor LR3 and the "summing" resistor SR total 10,000,000 ohms, a current of .005 milliampere flows through the "summing" resistor SR, thus producing an output potential $e_0$ of .005 v.

If it is desired to produce an output potential response $e_0$ representative of any 3-digit number, it is merely necessary to select and depress the desired digit selector switches in each of the decades 11, 12 and 13. For example, to represent the digital number "876" it is merely necessary to depress digit selector switch DS800 in the "hundreds" decade 11, digit selector switch DS70 in the "tens" decade 12 and digit selector switch DS6 in the "units" decade 13. Under these conditions, a current of .800 milliampere flows in the "hundreds" bus 16, a current of .070 milliampere flows in the "tens" bus 21 and a current of .006 milliampere flows in the "units" bus 23. Since each of these buses are connected to the input terminal 18 of a common "summing" resistor SR, the current flows are additive and .876 milliampere flows through the "summing" resistor SR, thus producing an output potential $e_0$ of .876 volt, which potential uniquely represents the digital number "876."

In practice, is has been found that decade converters are subjected to "loading error" which substantially decreases the accuracy of the detected potential $e_0$. This error may, for example, be on the order of 2.5% in magnitude. As most clearly illustrated in FIG. 3, the decade converter 10 (considering only the "hundreds" decade) can be considered comparable to a voltage divider connected across the terminals of a battery E with the variable tap lead T coupled to a current limiting resistor LR. The resistor LR is connected in series with one terminal 18 of the "summing" resistor SR, the latter having its other terminal 19 coupled to the negative terminal of the battery E.

If it is assumed that the values of the components are the same as the exemplary values heretofore described in connection with FIG. 1, then the total ohmic value of the precision resistor PR is 10,000 ohms. When the tap lead T is at the mid-point of the resistor PR (a condition corresponding to the depression of digit selector switch DS500), a current I will flow through the upper half of the resistor PR as indicated by the arrow. Those skilled in the art will appreciate that the current I is composed of $i_1$ plus $i_2$ where $i_1$ is the value of the current flowing through the tap lead T and the resistors LR, SR, while $i_2$ is the value of the current flowing through the lower half of resistor PR. Since the lower half of resistor PR (5,000 ohms) is connected in parallel with resistors LR and SR (100,000 ohms), the equivalent resistance of the lower half of resistor PR is determined as follows:

$$\frac{1}{Req}=\frac{1}{.5(PR)}+\frac{1}{100{,}000}$$

and R$eq$ is equal to 4,760 ohms. Thus, the total equivalent resistance of resistor PR is 9,760 ohms rather than 10,000 ohms. This causes a current flow I of 10.24 milliamperes rather than 10 milliamperes with a resultant IR drop across the upper half of resistor PR of 51.2 volts instead of 50 volts. Hence the potential present at the "hundreds" bus 16 is 48.8 volts rather than 50 volts and .488 milliampere flows through the "summing" resistor SR. Under these conditions the value of $e_0$ is .488 volt indicating the digital number "488" rather than the selected digital number "500." A loading error of 2.4% has been introduced. In order to produce the required current flow of .500 milliampere through the resistor SR under these conditions it is necessary to decrease the value of current limiting resistor LR from 99,000 ohms to 96,500 ohms.

In like manner, it may be calculated that when the tap lead T (FIG. 3) is moved to a position corresponding to depression of digit selector switch DS300, the potential present at the hundreds bus is 29.37 volts. In order to obtain the proper current flow through the "summing"

resistor SR, current limiting resistor LR must have a value of approximately 96,900 ohms.

In accordance with one of the important aspects of the present invention, provision is made for varying the total current limiting resistance in the resistance network so that current flow through the "summing" resistor accurately reflects the digital value indicated by the position of the digit selector switches in the various decades. In this manner the effect of loading error is rendered negligible. In the exemplary embodiment shown in FIG. 1 this is accomplished by inserting a secondary current limiting resistor R1–R9 in the tap leads T1–T9 respectively. The limiting resistors R1–R9 are therefore each selectively connected in series with one of the resistors LR1–LR3 when a respective one of the digit selector switches DS is closed.

Referring to FIG. 2, the "hundreds" decade portion of the converter 10 is shown. As the ensuing description proceeds it will be appreciated that the "tens" and "units" decades are substantially identical to the "hundreds" decade and thus a discussion of the "hundreds" decade will suffice for all. Assuming that the values of the precision resistors PR0–PR9 and the "summing resistor" SR are all selected to be 1,000 ohms, while the current limiting resistor LR1 is 96,500 ohms, then the required value for the various limiting resistors R1–R9 may be readily calculated. Thus, if the switch DS500 is depressed and a corresponding voltage of approximately 48.8 volts appears on the bus 16, the total current limiting resistance ($R5+LR1$) must be equal to 96,500 ohms in order to produce a current flow of .500 milliampere. Since resistance LR1 is equal to 96,500 ohms, R5 must be equal to zero ohms. In like manner the required value for each of the remaining resistors R1–R4 and R6–R9 may be calculated. In the exemplary case, such values would be:

R1 and R9—1600 ohms
R2 and R8—900 ohms
R3 and R7—400 ohms
R4 and R6—100 ohms

Of course, those skilled in the art will readily appreciate that the particular selected value for any of the resistance elements in the decade converter 10 may vary over a wide range dependent upon the desired results, such for example, as the desired magnitude of $e_0$.

Figures 3, 5, 6:
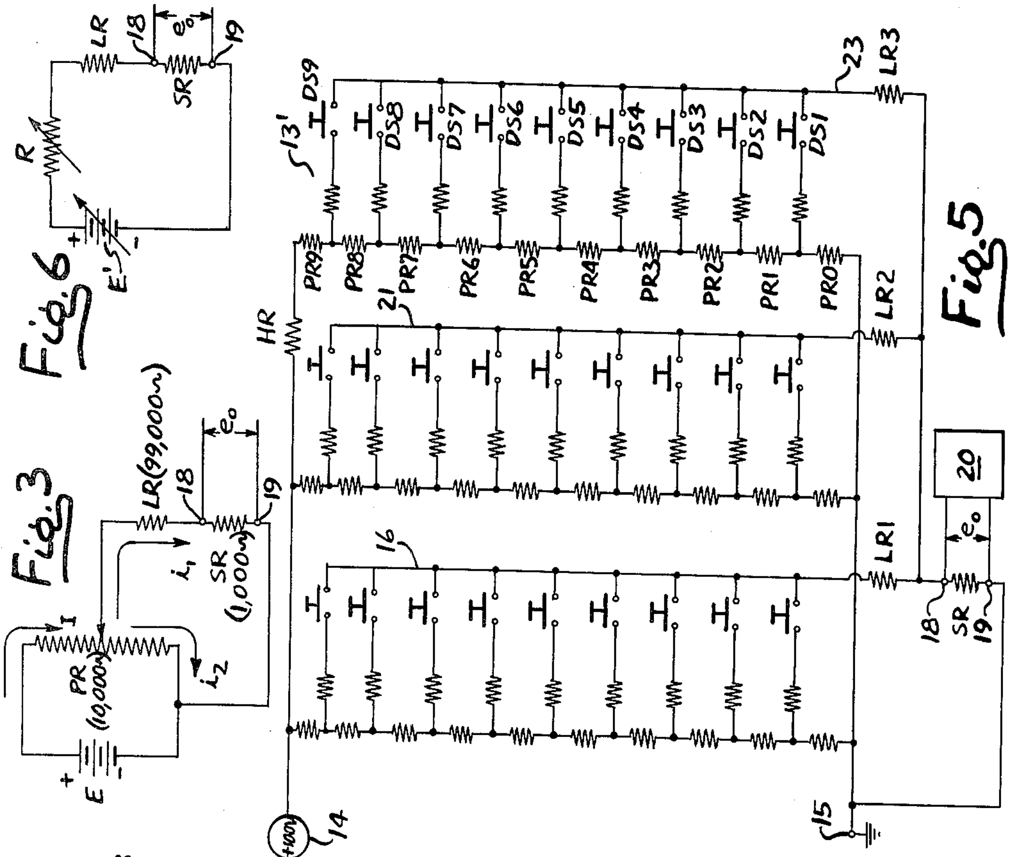
FIG. 3 is a simplified diagram of an equivalent circuit which in part represents by analogy a typical decade subject to loading error.
FIG. 5 is a schematic diagram of decade converter similar to FIG. 1, but showing an alternative circuit configuration.
FIG. 6 is a simplified diagram of an equivalent circuit which in part represents by analogy a decade embodying the features of the present invention.

As most clearly illustrated in FIG. 6, the decade converter 10 (considering only the "hundreds" decade portion 11 thereof) can be considered to be composed of a variable voltage source E' connected in series with a variable current limiting resistor R, a limiting resistor LR and a "summing" resistor SR. Thus, as the magnitude of the voltage derived from the source E' varies (i.e., as different digital selector switches are depressed), the series connected current limiting resistor R also varies (due to the correlation between the resistors R1–R9 and the tap position) and insures that the current flow through the "summing" resistor is accurately related to the magnitude of the tapped voltage minus any "loading error."

It has been found that the accuracy of a decade converter of the type shown in FIG. 1 may not only be materially increased, but moreover, this can be accomplished without materially increasing the cost thereof. For example, in order to obtain accurate and reliable results, it is necessary that the resistors PR0–PR9, SR and LR all be high quality, precision resistors having, for example, a permissible error of not greater than .02% (a somewhat greater permissible error can be tolerated in the "tens" and "units" decades). Such resistors may cost in the range of $3.00 a piece, and thus a total cost for the resistors in the converter 10 approximates $102.00. The current limiting resistors R1–R9 on the other hand may have a much greater permissible error since they are connected in series with highly accurate precision resistors LR and SR. In practice, the resistors R may have permissible error in the range of 1–5%, costing on the average, only $.25 a piece. Thus, in the form of the invention shown in FIG. 1, the plus 2% margin of error introduced by the "loading effect" can be rendered negligible simply by the addition of approximately $6.00 worth of resistors.

Figure 4:
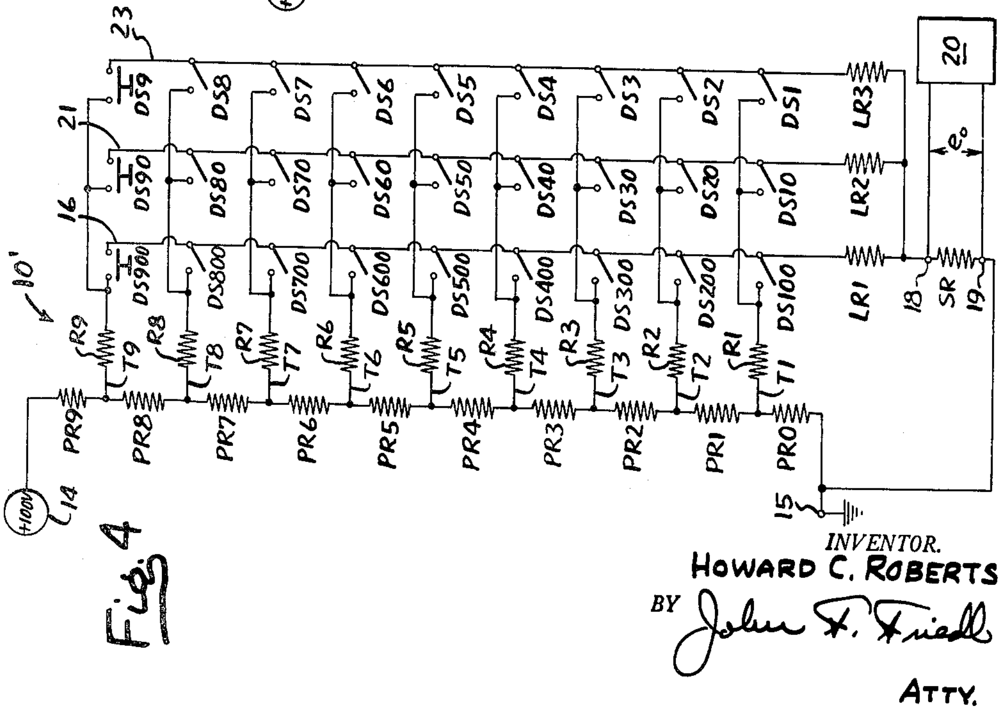
FIG. 4 is a schematic diagram of a modified form of decade converter.

Still greater savings may be obtained by the alternative form of decade converter 10' shown in FIG. 4. In this exemplary embodiment, a single decade of precision resistors PR0–PR9 is utilized. Here the tap leads T1–T9 are connected to multiple switch contacts. If for example, it is desired to produce an output potential $e_0$ of .553 volt (assuming the same exemplary resistance values as heretofore described), it is merely necessary to simultaneously depress the selector switches DS500, DS50 and DS3, thus simultaneously impressing potential levels of approximately 48.8 volts, 48.8 volts and 29.37 volts on the buses 16, 21 and 23, respectively. Because of the presence of the additional current limiting resistors R5 and R3, .500 milliampere flows through resistor LR1, .050 milliampere flows through resistor LR2, and .003 milliampere through resistor LR3. Thus a total of .553 milliampere flows through the "summing" resistor SR, producing the desired output potential $e_0$ of .553 volt corresponding to the digital number "553."

In this form of the invention it is only necessary to use 14 high accuracy precision resistors having an approximate value of $42.00. Eight current limiting resistors are necessary having an approximate total value of $2.00. Thus the total cost for the resistance elements of the decade converter 10' is only approximately $44.00.

It is often desirable in decade converters of the type shown in FIG. 1 to attempt to maintain current limiting resistance values in the "tens" or "units" decades as low as possible. This has heretofore been accomplished by inserting a high impedance in series with either or both of the precision resistors PR in the "tens" and "units" decades. In the form of the invention shown in FIG. 5, such a resistor HR is connected in series with the units decade 13'. Because of this, it is possible to step down the voltage applied across the decade and thus use a current limiting resistor LR3 of lesser value. For example, if the resistor HR has a value of 90,000 ohms, the resistor LR3 may have a value identical to the resistor LR2; i.e., 999,000 ohms instead of 9,999,000 ohms. However, it has been found that this initial step down in applied voltage tends to materially increase the "loading error" present in prior art decade converters. Therefore, the present invention finds particularly advantageous use in decades such as the "units" decade shown in FIG. 5.

I claim as my invention:

1. A decade converter comprising, in combination, a voltage source having first and second terminals, a voltage divider connected across said source and providing a plurality of points residing at respectively different voltage values relative to said second terminal, a plurality of $n$ decades of digit selector switches with each switch adapted to reside in either a first state or a second state, means connecting one side of each switch in any decade to a respective one of said points, means connecting the opposite side of all switches in a given decade to a common junction so that there are $n$ common junctions corresponding to respective ones of said $n$ decades, a summing resistor, $n$ current limiting means connected between respective ones of said $n$ junctions and one end of said summing resistor, the opposite end of said summing resistor being connected to said second terminal of said voltage source, means responsive to a change of any one of said switches in a given decade from said first to said second state for increasing by a predetermined amount the effective value of the current limiting means which corresponds to that decade, and means connected across said summing resistor to sense the voltage drop thereacross and thereby sense the digital value represented by the particular ones of said switches which are in said second state.

2. A decade converter comprising, in combination, a voltage source having first and second terminals, a voltage divider connected across said source and providing a plurality of points residing at respectively different voltage values relative to said second terminal, a plurality of $n$ decades of digit selector switches with each switch adapted to reside in either a first state or a second state and with the switches in each decade representative of the different digital characters "1" through "9," means connecting one side of each switch in any decade to a respective one of said points, means connecting the opposite side of all switches in a given decade to a common junction so that there are $n$ common junctions corresponding to respective ones of said $n$ decades, a summing resistor, $n$ current limiting means connected between respective ones of said $n$ junctions and one end of said summing resistor, the opposite end of said summing resistor being connected to said second terminal of said voltage source, limiting resistors coupled to each of said switches and adapted to be inserted in series with the corresponding one of said $n$ current limiting means upon change of a selected switch in a given decade from said first to second state for increasing by a predetermined amount the effective value of the current limiting means which corresponds to that decade, and means connected across said summing resistor to sense the voltage drop thereacross and thereby sense the digital value represented by the particular ones of said switches which are in said second state.

3. A decade converter comprising, in combination, a voltage source having first and second terminals, a voltage divider connected across said source and providing a plurality of points residing at respectively different voltage values relative to said second terminal, a plurality of $n$ decades of digit selector switches with each switch adapted to reside in either a first state or a second state and with the switches in each decade representative of the different characters "1" through "9," means connecting one side of each switch in any decade to a respective one of said points, means connecting the opposite side of all switches in a given decade to a common junction so that there are $n$ common junctions corresponding to respective ones of said $n$ decades, common means for summation of the currents flowing through the individual ones of said $n$ junctions when a selector switch in any one or more of said $n$ decades change to said second state, $n$ current limiting means connected between respective ones of said $n$ junctions and said summation means, said summation means being connected to said second terminal of said voltage source, means responsive to a change of any one of said switches in a given decade from said first to said second state for increasing by a predetermined amount the effective value of the current limiting means which corresponds to that decade, and means connected across said summation means for sensing the digital value represented by the particular ones of said switches which are in said second state.

References Cited by the Examiner

UNITED STATES PATENTS 2,718,634 9/55 Hansen -------------- 340—347

MALCOLM A. MORRISON, *Primary Examiner.*

DARYL W. COOK, *Examiner.*